US011988907B1

United States Patent
Son et al.

(10) Patent No.: US 11,988,907 B1
(45) Date of Patent: May 21, 2024

(54) ELECTRIC FIELD-TUNABLE IR DEVICES WITH VERY LARGE MODULATION OF REFRACTIVE INDEX AND METHODS TO FABRICATE THEM

(71) Applicant: HRL Laboratories, LLC, Malibu, CA (US)

(72) Inventors: Kyung-Ah Son, Moorpark, CA (US); Jeong-Sun Moon, Moorpark, CA (US); Hwa Chang Seo, Malibu, CA (US); Richard M. Kremer, Ramona, CA (US); Ryan G. Quarfoth, Malibu, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 397 days.

(21) Appl. No.: 17/212,611

(22) Filed: Mar. 25, 2021

Related U.S. Application Data

(60) Provisional application No. 63/094,756, filed on Oct. 21, 2020, provisional application No. 63/027,847, filed on May 20, 2020, provisional application No. 63/027,838, filed on May 20, 2020, provisional application No. 63/027,849, filed on May 20, 2020, provisional application No. 63/027,844, filed on May 20, 2020, provisional application No. 63/027,841, filed on May 20, 2020.

(51) Int. Cl.
*G02F 1/19* (2019.01)
*G02F 1/03* (2006.01)

(52) U.S. Cl.
CPC .......... *G02F 1/0316* (2013.01); *G02F 1/0333* (2013.01); *G02F 1/19* (2013.01); *G02F 2203/11* (2013.01)

(58) Field of Classification Search
CPC ........ G02F 1/0316; G02F 1/1033; G02F 1/19; G02F 2203/11
See application file for complete search history.

(56) References Cited

U.S. PATENT DOCUMENTS

| 4,466,703 A | 8/1984 | Nishimoto |
| 6,373,620 B1 | 4/2002 | Wang |

(Continued)

FOREIGN PATENT DOCUMENTS

| CN | 106480413 A | 3/2017 |
| CN | 106756793 A | 5/2017 |

(Continued)

OTHER PUBLICATIONS

PCT international Preliminary Report on Patentability (Chapter II) from PCT/US2021/023352 dated May 19, 2022.

(Continued)

*Primary Examiner* — Christopher Stanford
*Assistant Examiner* — Journey F Sumlar
(74) *Attorney, Agent, or Firm* — Ladas & Parry, LLP

(57) ABSTRACT

An electric field-controlled refractive index tunable device includes a phase change correlated transition metal oxide layer, and E-field responsive charge dopants. The E-field responsive charge dopants either accumulate in the phase change correlated transition metal oxide layer or are depleted from the phase change correlated transition metal oxide layer in response to an E-field applied to the phase change correlated transition metal oxide layer.

28 Claims, 6 Drawing Sheets

(56) References Cited

U.S. PATENT DOCUMENTS

| | | | |
|---|---|---|---|
| 7,087,882 B1* | 8/2006 | Dries | H01L 31/02027 |
| | | | 250/214 R |
| 7,312,917 B2 | 12/2007 | Jacob | |
| 10,955,720 B2 | 3/2021 | Son et al. | |
| 2005/0014033 A1 | 1/2005 | Cheung et al. | |
| 2006/0050358 A1 | 3/2006 | Bigman | |
| 2007/0053139 A1 | 3/2007 | Zhang et al. | |
| 2007/0097370 A1* | 5/2007 | Chism | H01L 22/14 |
| | | | 257/E21.531 |
| 2007/0171504 A1 | 7/2007 | Fujimori | |
| 2008/0212007 A1 | 9/2008 | Meredith | |
| 2010/0309539 A1 | 12/2010 | Kaye | |
| 2011/0038093 A1 | 2/2011 | Furukawa | |
| 2013/0063805 A1 | 3/2013 | Arnold | |
| 2016/0170244 A1 | 6/2016 | Ho et al. | |
| 2016/0284995 A1* | 9/2016 | Bajaj | H10N 70/826 |
| 2017/0031231 A1 | 2/2017 | Bhaskaran et al. | |
| 2017/0054099 A1 | 2/2017 | Friend et al. | |
| 2017/0113951 A1 | 4/2017 | Su et al. | |
| 2018/0046056 A1 | 2/2018 | Na et al. | |
| 2018/0059440 A1 | 3/2018 | Yu et al. | |
| 2018/0158616 A1 | 6/2018 | Lazarev | |
| 2019/0129275 A1 | 5/2019 | McManamon et al. | |
| 2019/0278150 A1 | 9/2019 | Son et al. | |
| 2021/0363629 A1 | 11/2021 | Son et al. | |
| 2021/0364881 A1 | 11/2021 | Kremer et al. | |
| 2021/0364884 A1* | 11/2021 | Kremer | G02F 1/0316 |
| 2022/0389561 A1 | 12/2022 | Son | |

FOREIGN PATENT DOCUMENTS

| | | |
|---|---|---|
| JP | 2007-147934 | 6/2007 |
| JP | 2016-050951 A | 4/2016 |
| KR | 10-2019-0092062 A | 8/2019 |
| KR | 20200029924 A | 3/2020 |
| WO | 2011/129979 A2 | 10/2011 |

OTHER PUBLICATIONS

From U.S. Appl. No. 16/296,049 (now published as U.S. Pat. No. 10,955,720), Notice of Allowance dated Nov. 24, 2020.
From U.S. Appl. No. 16/296,049 (now published as U.S. Pat. No. 10,955,720), Office Action dated Aug. 14, 2020.
PCT International Preliminary Report on Patentability (Chapter II) for PCT/US2019/021233 dated Sep. 25, 2019.
PCT International Search Report for PCT/US2019/021233 dated Jun. 26, 2019.
PCT Written Opinion of the International Searching Authority for PCT/US2019/021233 dated Jun. 26, 2019.
Chung, S., et al., "A Monolithically Integrated Large-Scale Optical Phased Array in Silicon-on-Insulator CMOS", IEEE Journal of Solid-State Circuits, vol. 53, Issue 1, entire document, Jan. 2018.
Ha, et al., "Examination of insulator regime conduction mechanisms in epitaxial and polycrystalline $SmNiO_3$ thin films", Journal of Applied Physics, 110, 094102 (2011), entire document.
Helmbrecht, et al., "Piston-tip-tilt positioning of a segmented MEMS deformable mirror," Proceedings of SPIE 6467, MEMS Adaptive Optics, 64670M (Feb. 9, 2007), entire document.
Li, Z., et al., "Correlated Perovskites as a New Platform for Super-Broadband-Tunable Photonics", Advanced Materials, 28, 9117-9125 (2016) and Supporting Information, entire document.
Mike Hanlon, "Eyeglasses with Adaptive Focus", New Atlas, Health and Well Being, Apr. 15, 2006, https://newatlas.com/eyeglasses-with-adaptive-focus/5516 (printed: Jun. 3, 2021), entire document.
Milanovic, V., et al., "Tip-tilt-piston Actuators for High Fill-Factor Micromirror Arrays", Solid-State Sensor, Actuator and Microsystems Workshop, Jun. 6-10, 2004, entire document, www.adriaticresearch.org/Research/pdf/HHH04.pdf.
Shi, et al., "Colossal resistance switching and band gap modulation in a perovskite nickelate by electron doping", Nature Communications 5, 4860 (2014) doi:10.1038/ncomms5860, entire document.
Wang, et al., "Micromirror Based Optical Phased Array for Wide-Angle Beamsteering", MEMS 2017, Las Vegas, NV, USA, Jan. 22-26, 2017, entire document.
Zewei Shao et al., 'Recent progress in the phase-transition mechanism and modulation of vanadium dioxide materials', NPG Asia Materials, Jul. 25, 2018, entire document [Retrieved on May 27, 2021]. Retrieved from the Internet: <URL: https://www.nature.com/articles/s41427-018-0061-2>.
PCT International Search Report for PCT/US2021/023352 dated Jun. 22, 2021.
PCT Written Opinion of the International Searching Authority for PCT/US2021/023352 dated Jun. 22, 2021.
Shi et al., "A correlated nickelate synaptic transistor", Nature Communications, Oct. 31, 2013, entire document.
From U.S. Appl. No. 17/206,927 (now published as US 2021-0363629 A1), Office Action dated Dec. 1, 2021.
PCT International Search Report and Written Opinion from PCT/US2021/023265 dated Jul. 8, 2021.
PCT International Search Report and Written Opinion from PCT/US2021/020544 dated Jun. 23, 2021.
Boileau, A. et al. "Mechanisms of Oxidation of $NdNiO_{3-\delta}$ Thermochromic Thin Films Synthesized by a Two-Step Method in Soft Condition", The Journal of Physical Chemistry C, 2014, vol. 118, Iss. 11, entire document.
Neumann, B. et al. "Niobium-doped $TiO_2$ films as window layer for chalcopyrite solar cells", Physica Status Solidi B, 2008, vol. 245, No. 9, entire document.
Phare, et al., "Silicon Optical Phased Array with High-Efficiency Beam Formation over 180 Degree Field of View" Department of Electrical Engineering, Columbia University, New York, NY 10027, USA, entire document, which may be found at arXiv:1802.04624, 2018.
From U.S. Appl. No. 17/206,927, Office Action dated Feb. 10, 2022.
From U.S. Appl. No. 17/190,031 (now published as US 2021/0364884) Office Action dated Sep. 30, 2021.
From U.S. Appl. No. 17/190,031 (now published as US 2021/0364884) Notice of Allowance dated Jan. 4, 2022.
From U.S. Appl. No. 17/190,031 (now published as US 2021/0364884) Notice of Allowance dated Feb. 11, 2022.
From U.S. Appl. No. 17/890,913 (now published as US 2022-0389561 A1), Office Action dated Dec. 5, 2023.
Oh et al. "Correlated memory resistor in epitaxial $NdNiO_3$ heterostructures with asymmetrical proton concentration", Applied Physics Letters 108, 122106 (2016), pp. 122106-1-122106-5 (Year: 2016).
Qiao et al. "Effect of substrate temperature on the microstructure and transport properties of highly oriented (100)-oriented $LaNiO_3$-sigma films by pure argon sputtering", Journal of Crystal Growth 310 (2008) pp. 3653-3658 (Year: 2008).
Zhao et al. "A study on the thermostability of $LaNiO_3$ films", Surface & Coatings Technology, 192 (2005) pp. 336-340 (Year: 2005).
From U.S. Appl. No. 17/206,756 (now published as US 2021-0364881 A1), Office Action dated Sep. 14, 2023.

\* cited by examiner

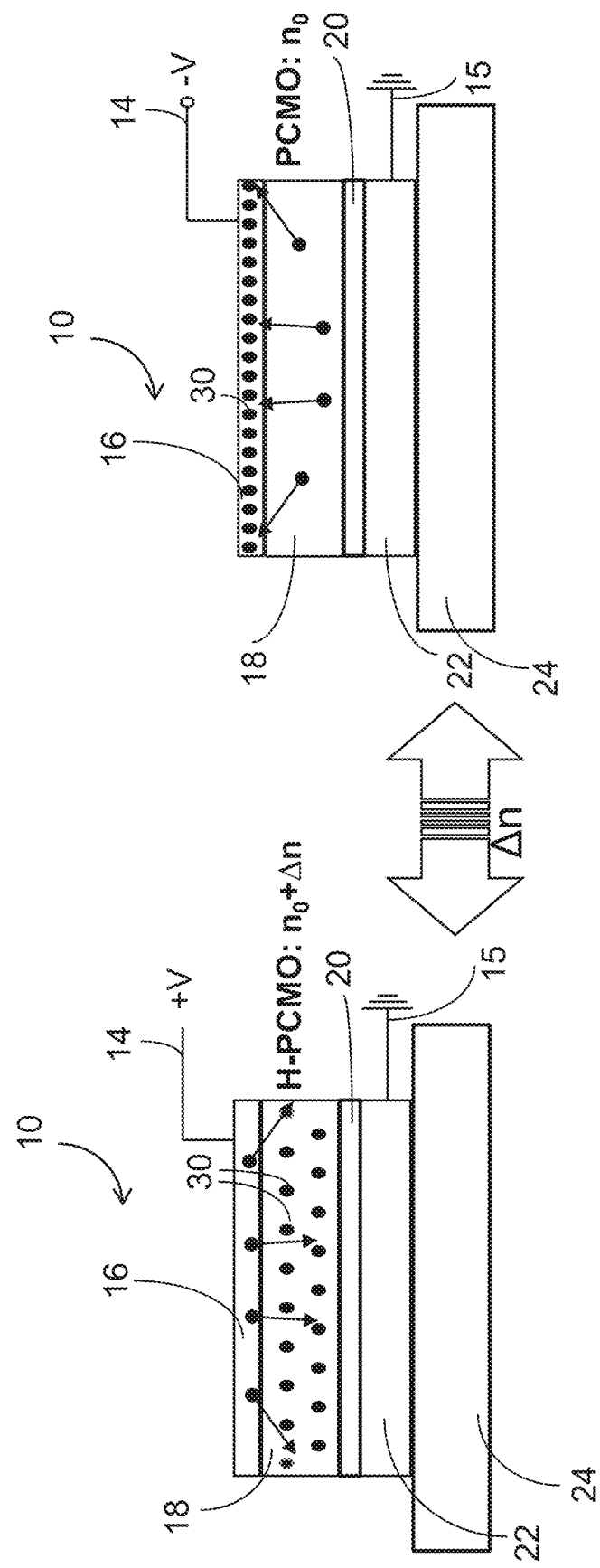

ELECTRIC FIELD-TUNABLE IR DEVICES WITH VERY LARGE MODULATION OF REFRACTIVE INDEX AND METHODS TO FABRICATE THEM

CROSS REFERENCE TO RELATED APPLICATIONS

This application is related to and claims the benefit of U.S. Provisional Patent Application Ser. No. 63/094,756, filed Oct. 21, 2020, and entitled "Electric Field-Tunable IR Devices with very Large Modulation of Refractive Index and Methods to Fabricate them", which is hereby incorporated herein by reference.

This application is also related to and claims the benefit of U.S. Provisional Patent Application Ser. No. 63/027,838, filed May 20, 2020, and entitled "Solid State Electrically Variable-Focal Length Lens", which is hereby incorporated herein by reference.

This application is also related to and claims the benefit of U.S. Provisional Patent Application Ser. No. 63/027,844, filed May 20, 2020, and entitled "Solid State Tip-Tilt Phased Array", which is hereby incorporated herein by reference.

This application is also related to and claims the benefit of U.S. Provisional Patent Application Ser. No. 63/027,841, filed May 20, 2020, and entitled "Solid-state Electrically-Variable Optical Wedge", which is hereby incorporated herein by reference.

This application is also related to and claims the benefit of U.S. Provisional Patent Application Ser. No. 63/027,847, filed May 20, 2020, and entitled "Method to Grow IR Optical Materials with Extremely Small Optical Loss", which is hereby incorporated herein by reference.

This application is also related to and claims the benefit of U.S. Provisional Patent Application Ser. No. 63/027,849, filed May 20, 2020, and entitled "Method to Grow Thick Crystalline Optical Films on Si Substrates", which is hereby incorporated herein by reference.

This application is also related to U.S. patent application Ser. No. 16/296,049, filed 7 Mar. 2019, and entitled "Electrically Reconfigurable Optical Apparatus Using Electric Field", which is hereby incorporated herein by reference.

STATEMENT REGARDING FEDERAL FUNDING

This invention was made under U.S. Government Contract No. NRO000-18-C-0102. The U.S. Government may have certain rights in this invention.

TECHNICAL FIELD

This disclosure relates to infrared optical devices.

BACKGROUND

An infrared (IR) optical device for which the refractive index (RI) can be modulated continuously over a large range at high-speed with low power requirements is highly desirable. However, in the prior art there is no technology that can provide high-speed, continuous and large RI modulation at IR wavelengths with low power requirements. The refractive index (RI) tuning, or refractive index change $\Delta n$, that can be obtained by using a nonlinear electro-optic Kerr and Pockels effect or an electro-absorptive effect (e.g., a Franz-Keldysh or a quantum-confined Stark effect) is small for free-space modulation. For instance, the $\Delta n$ is $<10^{-2}$ using the electro-optic Kerr effect, and the $\Delta n$ is $<10^{-4}$ using the electro-optic Pockels effect. While liquid crystals can show a sizable change in RI ($\Delta n \sim 1$), their utility has been limited in imaging applications due to a slow tuning speed (~10 msec) and high losses for infrared wavelengths. Based on the Drude-Lorentz model, charge-injection into semiconductors is an alternative way to modulate the refractive index (RI) with a large $\Delta n$ at high-speed when a significant free carrier charge ($>10^{20}/cm^3$) is introduced. However, the $\Delta n$ is limited to below $10^{-3}$ for conventional semiconductors (e.g., Si, and III-V semiconductors).

Z. Li, Y. Zhou, H. Qi, et al., in "Correlated Perovskites as a New Platform for Super-Broadband-Tunable Photonics", Advanced Materials, 28, 9117 (2016), which is incorporated herein by reference, describe modulating the refractive index of $SmNiO_3$ (SNO) in infrared (IR) wavelengths using intercalation/de-intercalation of (1) lithium-ion and (2) proton. For Li-ion intercalation/de-intercalation (a liquid phase electrochemical reaction), a voltage was applied between an SNO film coated with $LiClO_4$ electrolyte and a Li electrode in contact with the electrolyte to drive ion transport into and out of the SNO film. For proton intercalation, a Pt-assisted proton doping of an SNO film was carried out using a forming gas at 300° C. for 1 hour. For proton de-intercalation, the proton-doped SNO film was annealed in $O_3$ at 400° C. for 2 hours. However, the carrier doping/de-doping methods for SNO in the prior art are incompatible with reconfigurable optical elements and are too slow (e.g. tens of minutes).

What is needed is an infrared (IR) optical device for which the refractive index (RI) $\Delta n$ can be modulated continuously over a large range at high-speed with low power requirements. The embodiments of the present disclosure answer these and other needs.

SUMMARY

In a first embodiment disclosed herein, an electric field-controlled refractive index tunable device comprises a phase change correlated transition metal oxide layer, and E-field responsive charge dopants, wherein the E-field responsive charge dopants either accumulate in the phase change correlated transition metal oxide layer or are depleted from the phase change correlated transition metal oxide layer in response to an E-field applied to the phase change correlated transition metal oxide layer.

In another embodiment disclosed herein, a method of providing an electric field-controlled refractive index tunable device comprises providing a phase change correlated transition metal oxide layer. providing E-field responsive charge dopants, and tuning an E-field on the phase change correlated transition metal oxide layer to either accumulate E-field responsive charge dopants in the phase change correlated transition metal oxide layer or to deplete E-field responsive charge dopants from the phase change correlated transition metal oxide layer.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIGS. 1A, 1B, 1C, 1D, 1E and 1F show cross-sectional schematics of E-field-tunable IR devices. FIGS. 1A and 1B show a "Top electrode-PCMO-Barrier-Bottom electrode" configuration, FIGS. 1C and 1D show a "Top electrode-PCMO-Bottom electrode-Barrier" configuration, and FIGS. 1E and 1F show another "Top electrode-PCMO-Bottom electrode-Barrier" configuration in accordance with the present disclosure.

DETAILED DESCRIPTION

Figures 1C, 1D:
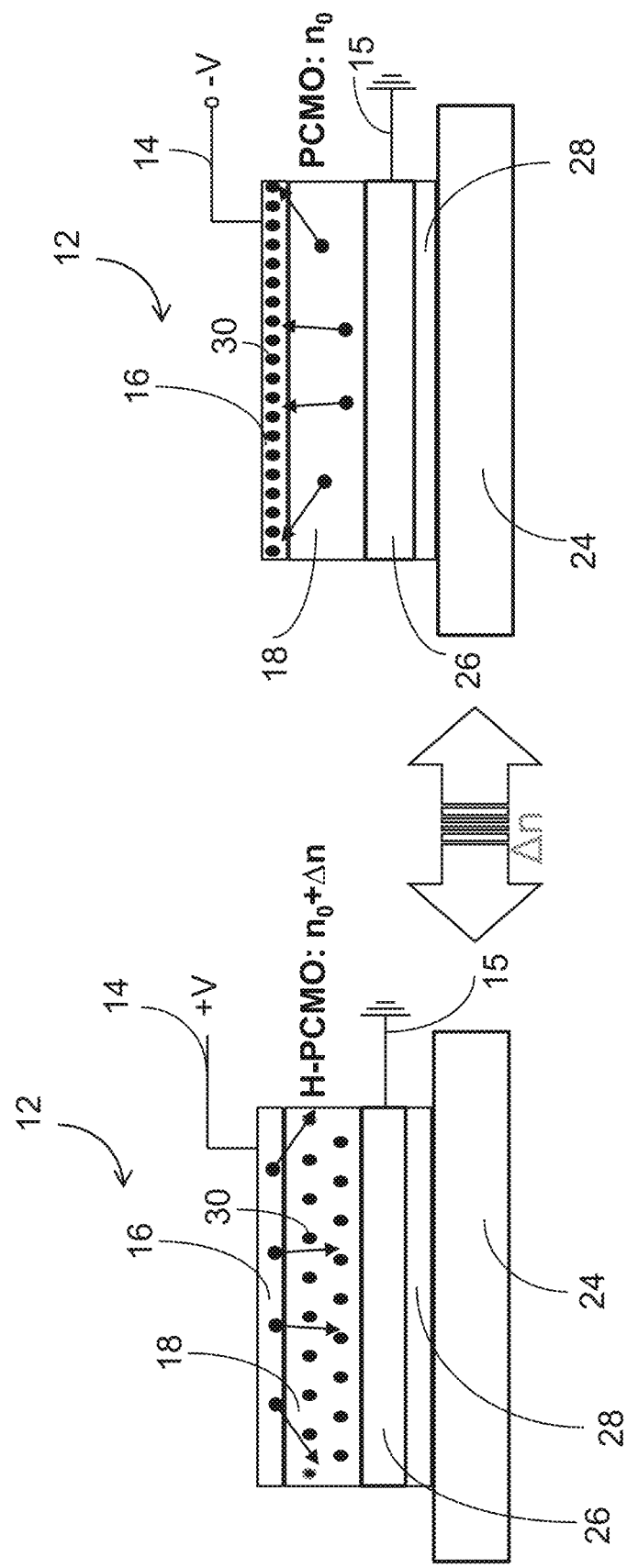

The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to (i) all papers and documents which are filed concurrently with this specification and which are open to public inspection with this specification (the contents of all such papers and documents are incorporated herein by reference) and (ii) all papers and documents which are otherwise incorporated by reference herein (but not physically filed with this specification).

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

The present disclosure describes an infrared (IR) optical device whose refractive index (RI) can be tuned over a large scale with an applied electric field (E-field). The reconfigurable optical devices of the present disclosure are based on phase-change correlated transition metal oxides (PCMOs) doped with E-field responsive charge carriers, for example, hydrogen atoms. E-field controlled accumulation and depletion of dopants in the PCMOs is utilized to induce large and continuous RI changes while keeping the optical insertion loss of the material very low. By E-field control of the accumulation and depletion of dopants, the RI changes may be continuous over a range between substantially full accumulation in a PCMO and substantially full depletion from the PCMO. For infrared red (IR) wavelengths, the optical extinction coefficient k can be less than 0.01.

The technology of the present disclosure enables all-solid-state optical beam steering and reconfigurable lenses for real-time sensors. Further, the technology is scalable to large wafer-scale devices and fabrication processes are based on conventional CMOS micro-device fabrication processes.

The present disclosure enables large and continuous modulation of the refractive index of an IR optical structure with low direct current (DC) power dissipation. The refractive index can be modulated at a reconfiguration rate or speed, which may be higher than 1 MHz. Thus. a reconfiguration time may be shorter than 1 microsecond. This speed is much faster and well beyond the capability of the prior art. Applications for this technology include reconfigurable and adaptive IR imaging systems, and in particular high-speed reconfigurable IR optical devices including infrared mirrors, lenses, and gratings.

Figures 1E, 1F:
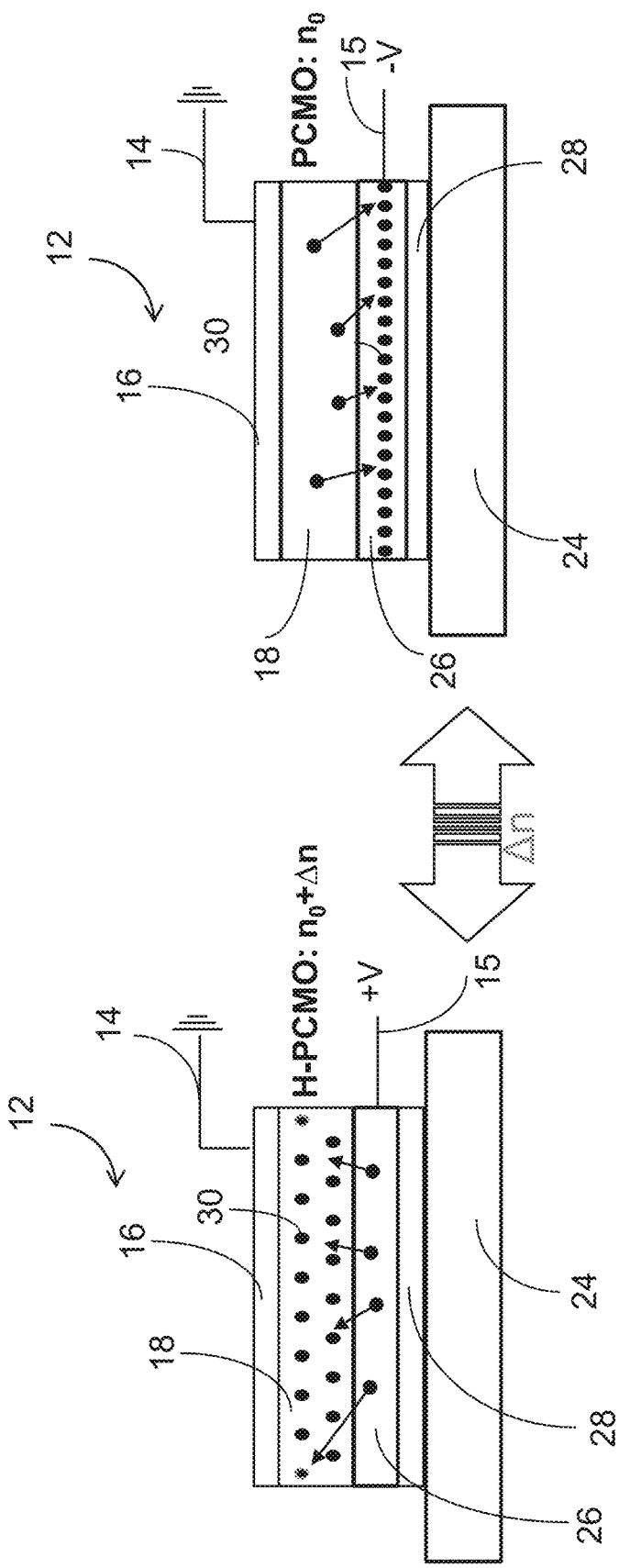

FIGS. 1A, 1B, 1C, 1D, 1E and 1F show cross-sectional schematics of E-field-tunable IR devices. FIGS. 1A and 1B show a "Top electrode-PCMO-Barrier-Bottom electrode" configuration, FIGS. 1C and 1D show a "Top electrode-PCMO-Bottom electrode-Barrier" configuration, and FIGS. 1E and 1F show another "Top electrode-PCMO-Bottom electrode-Barrier" configuration in accordance with the present disclosure.

The E-field-controlled reconfigurable IR elements shown in FIGS. 1A, 1B, 1C, 1D, 1E and 1F each have an optically transparent top electrode 16, which may be: a catalytic transition metal, such as platinum (Pt), palladium (Pd) or nickel (Ni), which may be ultrathin and which may be formed using atomic layer deposition (ALD) or by sputter-deposition; a graphene layer; or a $LaNiO_3$-based layer. Below the optically transparent top electrode 16 is a doped phase change correlated transition metal oxide (PCMO) film layer 18. The dopants 30 are E-field responsive charge carriers, which may be, for example, hydrogen atoms. So, for example, the phase change correlated transition metal oxide (PCMO) film layer 18 may be hydrogen-doped. The doped phase change correlated transition metal oxide (PCMO) film layer 18 may be $NdNiO_3$ (NNO), $SmNiO_3$ (SNO), $PrNiO_3$, $EuNiO_3$, or $GdNiO_3$. These materials may be used individually or in combinations, meaning in the form of alloys, for example $Sm_{1-x}Nd_xNiO_3$, to form PCMO layer 18. The PCMO layer 18 is optically transparent over the infrared wavelength range with an extremely small optical loss. For example, the PCMO layer 18 may have an optical extinction coefficient k of less than 0.01. The complex refractive index of the PCMO layer 18 is $\underline{n}=n+ik$, where n is the refractive index (RI), k is the optical extinction coefficient and i is the symbol for the imaginary part of the complex refractive index.

In FIGS. 1A and 1B, which show the "Top electrode-PCMO-Barrier-Bottom electrode" configuration 10, a diffusion barrier layer 20 for dopants is below the doped PCMO film layer 18. The diffusion barrier layer 20 for dopants may be, for example, a graphene layer (e.g., a transferred CVD graphene monolayer, bilayer, or a multilayer), a nitride-based dielectric thin film, or an oxide-based dielectric thin film. The diffusion barrier layer 20 is a barrier layer for diffusion of dopants, such as hydrogen (H) dopants, to the substrate 24. A metal bottom electrode 22 is below the diffusion barrier layer 20. The metal bottom electrode 22 is on the substrate 24. The substrate 24 may be semiconductor (e.g., Si, GaAs, SiC), an electrically insulating wafer (e.g., $SiO_2$, $Si_3N_4$, $LaAlO_3$, $BaTiO_3$, $SrTiO_3$, & glass), a mechanically rigid substrate, or a flexible substrate, such as polyethylene terephthalate (PET).

E-field controlled large IR refractive index tuning or change is depicted in FIGS. 1A and 1B with a hydrogen-doped PCMO (H-PCMO) layer 18. A positive E-field 14 between the top electrode 16 and the bottom electrode 22, which may be at ground 15, as shown in FIG. 1A, causes H dopants 30 to accumulate in the H-PCMO layer 18. A negative E-field 14 between the top electrode 16 and the bottom electrode 22, which may be at ground 15, as shown in FIG. 1B causes H dopants 30 to be depleted from the H-PCMO layer 18 and to move to the top electrode 16. The top electrode 16 serves as a reservoir for the H dopants 30. Depending on the applied voltage 14, the top electrode releases H dopants 30 to the H-PCMO layer 18, or stores H dopants 30, resulting in the changes of refractive index in the H-PCMO layer 18 from no (for pristine and undoped PCMO) to $n_0+\Delta n$ for doped H-PCMO. In FIG. 1A with a positive E-field 14 the refractive index of the H-PCMO layer 18 is $n_0+\Delta n$, and in FIG. 1B with a negative E-field 14 the refractive index of the H-depleted PCMO layer 18 is close to no.

By E-field control of the accumulation and depletion of dopants, the RI changes may be continuous over a range between substantially full accumulation of dopants 30 in the PCMO layer 18, as shown in FIG. 1A, and substantially full depletion of dopants 30 from the PCMO layer 18, as shown in FIG. 1B when the dopants 30 move to the top electrode 16. By varying the voltage on the top electrode 16 to a voltage value between +V and −V, relative to the voltage on the bottom electrode 22, which may be at ground, the refractive index of the phase change correlated transition metal oxide (PCMO) film layer 18 may be set to any desired value between the range from no to $n_0+\Delta n$.

The PCMO layer 18 is optically transparent over the infrared wavelength range with an extremely small optical loss. For example, for infrared red (IR) wavelengths, the optical extinction coefficient k of the PCMO layer 18 may be less than 0.01.

The E-field controlled IR refractive index tuning from a refractive index with a positive E-field, shown in FIG. 1A, to a refractive index with a negative E-field, shown in FIG. 1B, or from a refractive index with a negative E-field, shown in FIG. 1B, to a refractive index with a positive E-field, shown in FIG. 1A, can be modulated at a high reconfiguration rate or speed, which may be higher than 1 megaHertz (MHz). Thus. a reconfiguration time from substantially full accumulation of dopants 30 in PCMO layer 18 to substantially full depletion of dopants 30 from the PCMO layer 18 to the top electrode 16 may be shorter than 1 microsecond. This speed is much faster and well beyond the capability of the prior art.

In FIGS. 1C and 1D, which show a "Top electrode-PCMO-Bottom electrode-Barrier" configuration 12, a bottom electrode 26, which may be a thin metallic film or graphene, is directly below the doped PCMO film layer 18. In this configuration, a dopant diffusion barrier layer 28 is below the bottom electrode 26. The diffusion barrier layer 28 for dopants may be, for example, a graphene layer (e.g., a transferred CVD graphene monolayer, bilayer, or a multilayer), a nitride-based dielectric thin film, or an oxide-based dielectric thin film. The dopant diffusion barrier layer 28 is on the substrate 24.

In the "Top electrode-PCMO-Bottom electrode-Barrier" configuration, shown in FIGS. 1C and 1D, the top electrode 16 functions as a dopant reservoir, such as a H-dopant reservoir. E-field controlled large IR refractive index tuning is depicted in FIGS. 1C and 1D with a hydrogen-doped PCMO (H-PCMO) layer 18. A positive E-field 14 between the top electrode 16 and the bottom electrode 26, which may be at ground 15, as shown in FIG. 1C, accumulates H dopants 30 in the H-PCMO layer 18. A negative E-field 14 between the top electrode 16 and the bottom electrode 26 at ground 15, as shown in FIG. 1D, depletes H dopants 30 from the H-PCMO layer 18 and the dopants move to the top electrode 16. The top electrode 16 serves as a reservoir for H dopants, reversibly releasing H dopants to the H-PCMO layer 18 and storing H dopants from the H-PCMO layer 18, in response to the applied voltage 14. In FIG. 1C with a positive E-field 14, the refractive index of the H-PCMO layer 18 is $n_0+\Delta n$, and in FIG. 1D with a negative E-field 14 the refractive index of the H-depleted PCMO layer 18 is close to no, the refractive index of the un-doped pristine PCMO.

FIGS. 1E and 1F show another "Top electrode-PCMO—Bottom electrode-Barrier" configuration, which is the same as the configurations shown in FIGS. 1C and 1D, but in which the electrical bias on the top and bottom electrodes are reversed. In FIGS. 1E and 1F the top electrode 16 is at ground, and the bottom electrode has a positive bias +V or a negative bias −V, as shown in FIGS. 1E and 1F, respectively. A negative bias −V on the bottom electrode 26 depletes H dopants 30 from the H-PCMO layer 18 and the dopants move to the bottom electrode 26, as shown in FIG. 1F. A positive bias +V on the bottom electrode 26 accumulates H dopants 30 in the H-PCMO layer 18, as shown in FIG. 1E.

By E-field control of the accumulation and depletion of dopants, the RI changes may be continuous over a range between substantially full accumulation of dopants 30 in the PCMO layer 18, as for example shown in FIG. 1C, and substantially full depletion of dopants 30 from the PCMO layer 18, as for example shown in FIG. 1D. By varying the voltage on the top electrode 16 to a voltage value between +V and −V, relative to the voltage on the bottom electrode 26, which may be at ground, the refractive index of the phase change correlated transition metal oxide (PCMO) film layer 18 may be set to any desired value between the range from no to $n_0+\Delta n$.

The PCMO layer 18 is optically transparent over the infrared wavelength range with an extremely small optical loss. For example, for infrared red (IR) wavelengths, the optical extinction coefficient k of the PCMO layer 18 may be less than 0.01.

The E-field controlled IR refractive index tuning from a refractive index with a positive E-field, as for example shown in FIG. 1C, to a refractive index with a negative E-field, as for example shown in FIG. 1D, or from a refractive index with a negative E-field, shown in FIG. 1D, to a refractive index with a positive E-field, shown in FIG. 1C, can be modulated at a high reconfiguration rate or speed, which may be higher than 1 megaHertz (MHz). Thus. a reconfiguration time from substantially full accumulation of dopants 30 in PCMO layer 18 to substantially full depletion of dopants 30 from the PCMO layer 18 to the top electrode 16 may be shorter than 1 microsecond. This speed is much faster and well beyond the capability of the prior art.

FIGS. 1A, 1B, 1C, 1D, 1E and 1F describe Hydrogenic E-field Modulation of a hydrogen-doped PCMO, which leverages the unique optical properties of PCMOs varying with charge carrier doping to modulate the refractive index (RI) of PCMOs.

As described above, for example with respect to FIGS. 1A and 1B, the refractive index may be continuously tuned or varied over a range by varying the E-field 14, as desired, anywhere between a positive +V and negative −V E-field 14. By varying the voltage on the top electrode 16 to a voltage value between +V and −V, relative to the voltage on the bottom electrode 22 or 26, which may be at ground, the refractive index of the phase change correlated transition metal oxide (PCMO) film layer 18 may be set to any desired value between the range from no to $n_0+\Delta n$. In a nonlimiting example, the E-field 14 may, for example, be set to +½ V so that the refractive index of the phase change correlated transition metal oxide (PCMO) film layer 18 is $n_0+½\Delta n$, for example, or some other value between the range from no to $n_0+\Delta n$. The refractive index variation may vary in a linear or other manner and may also be a function of wavelength as shown in FIG. 3.

It should be understood that the E-field responsive charge dopants may be either positively charged or electron accepting E-field responsive charge dopants or instead may be negatively charged or electron donating E-field responsive charge dopants. So depending on which E-field dopants are used, and how the voltages are applied between the top electrode and the bottom electrode, a person skilled in the art would understand that the E-field responsive dopants can be caused to accumulate in the phase change correlated transition metal oxide layer 18, or the top electrode 16 for the configurations of FIGS. 1A and 1B with diffusion barrier 20 over the bottom electrode 22. For the configurations shown in FIGS. 1C, 1D, 1E and 1F with the diffusion barrier 28 below the bottom electrode 26, a person skilled in the art would understand that depending on which E-field dopants are used, and how the voltages are applied between the top electrode 16 and the bottom electrode 26 that the E-field responsive dopants can be caused to accumulate in the phase change correlated transition metal oxide layer 18, in the top electrode 16 or in the bottom electrode 26.

Figure 2:
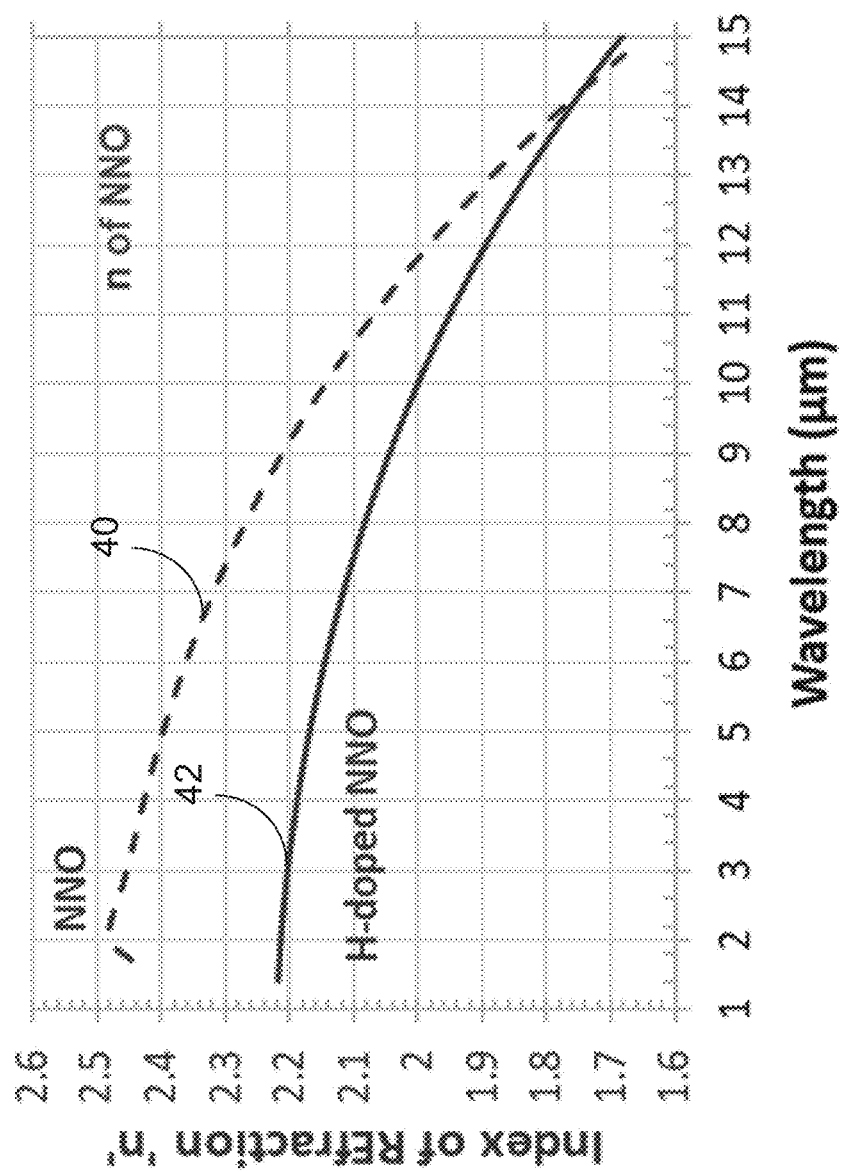
FIG. 2 shows the refractive index (n) curves of $NdNiO_3$ (NNO) before and after H-doping in accordance with the present disclosure.

To study refractive index (RI) modulation of PCMOs, example PCMOs of NdNiO3 (NNO) (Neodymium Nickelate), and SmNiO3 (SNO) (Samarium Nickelate) were investigated. FIG. 2 shows the RI of $NdNiO_3$ (NNO) films before doping 40, and after H-doping 42 measured in the infrared (IR) spectral range. Curve 40 corresponds to as-deposited crystalline NNO, and curve 42 corresponds to H-doped crystalline NNO. The difference between the two RI curves 40 and 42 indicates the range of RI modulation that can be achieved with the E-field controlled H-doping of NNO for the tunable IR devices shown in FIGS. 1A, 1B, 1C, 1D, 1E and 1F. As shown in FIG. 2, the range of RI modulation is a function of the wavelength. The data shown here are initial results acquired without any optimization of H-doping. With the optimization of H-doping in PCMOs, the range of RI modulation achievable with E-field can be improved significantly, for example to $\Delta n > 1$.

Figure 3:
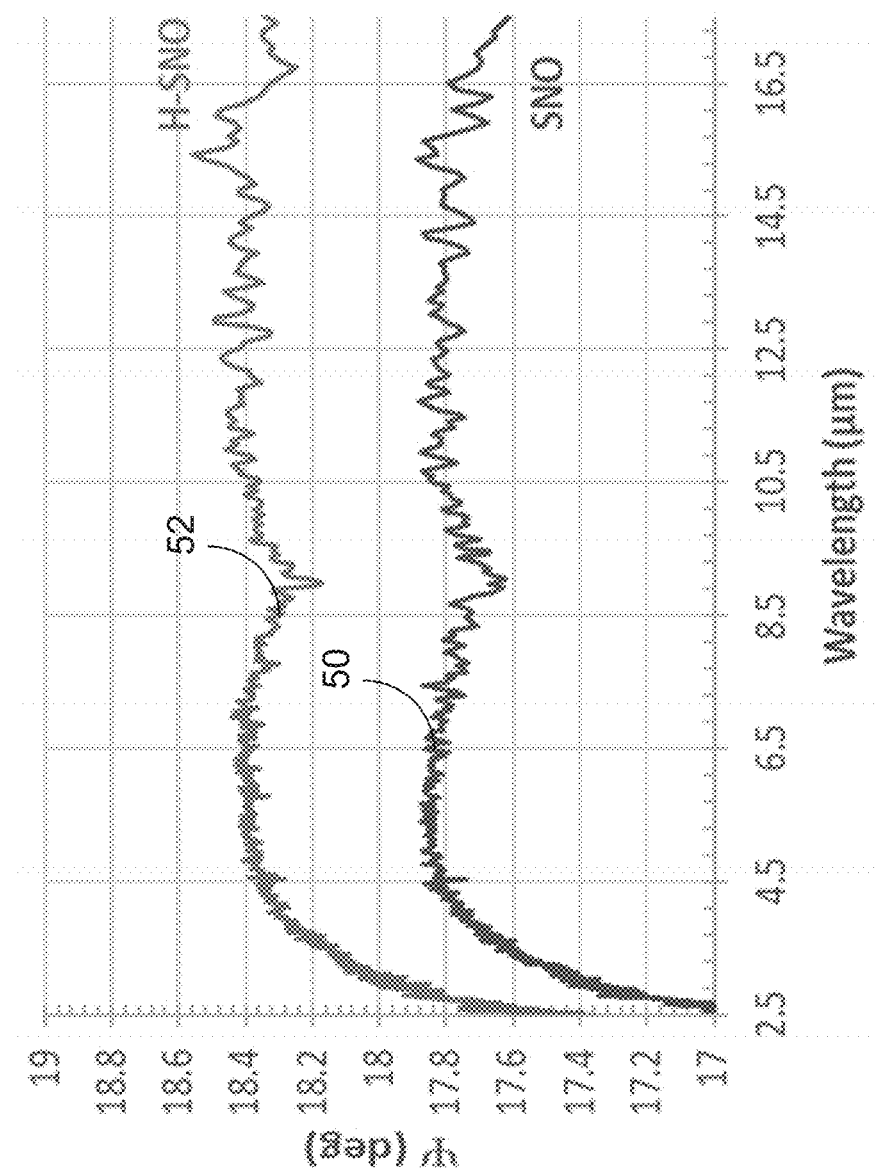
FIG. 3 shows IR spectroscopic ellipsometry data (Ψ) of a crystalline $SmNiO_3$ (SNO) film taken before and after H-doping in accordance with the present disclosure.

FIG. 3 shows IR Spectroscopic Ellipsometry measurement data, $\Psi$, of as-deposited $SmNiO_3$ (SNO) 50 and H-doped SNO 52 films, denoting changes in $\Psi$ associated with H-doping ($\Delta\Psi \sim 0.6$ at $\lambda=4.5$ μm).

Figure 4:
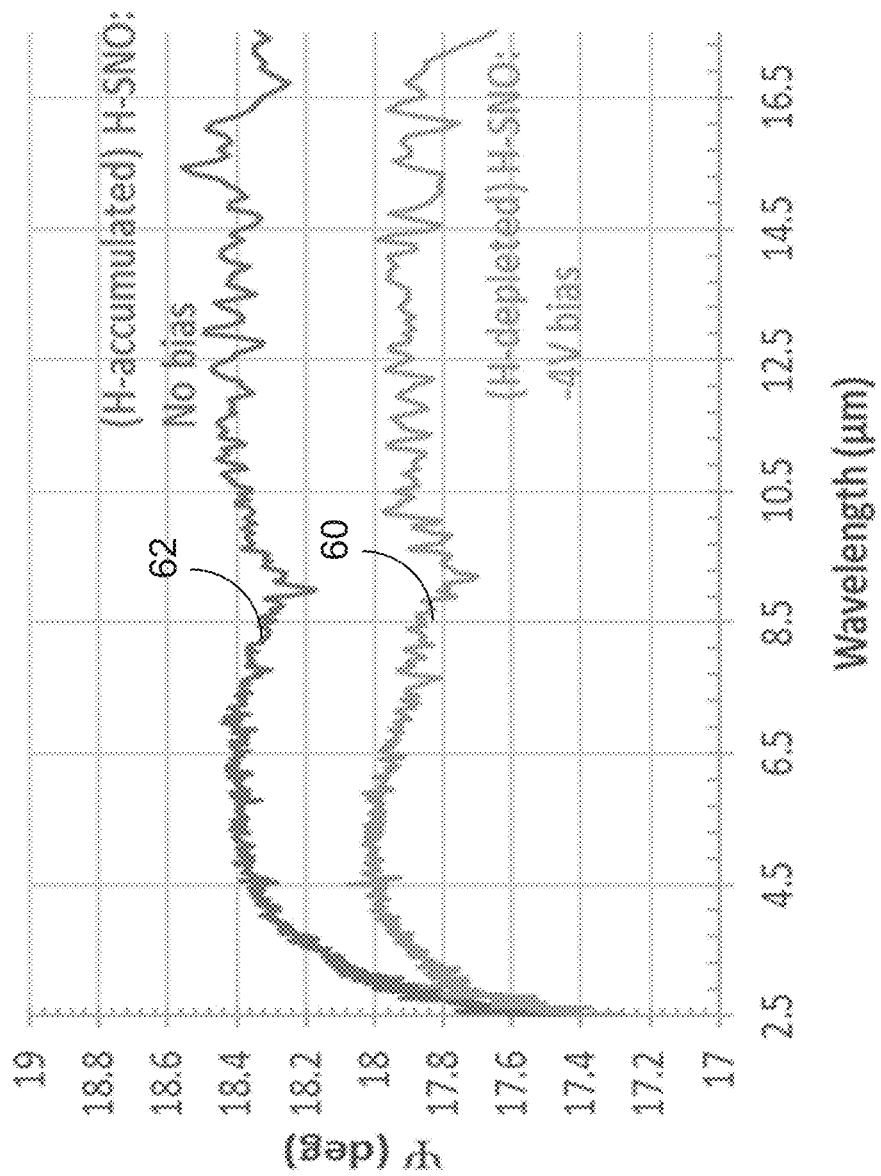
FIG. 4 shows IR spectroscopic ellipsometry data (Ψ) of H-doped crystalline $SmNiO_3$ (SNO) film taken with no electrical bias and with a −4V bias in accordance with the present disclosure.

FIG. 4 shows $\Psi$ of the H-doped SNO film measured with a negative electrical bias 60 and without an electrical bias 62. With a bias of V=−4V applied to the H-doped SNO film (~180 nm thick), $\Delta\Psi \sim 0.4$ is measured at $\lambda=4.5$ μm, suggesting a significant depletion of H dopants from the H-doped SNO.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. The applicants have made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Section 112, as it exists on the date of filing hereof, unless the element is expressly recited using the phrase "means for . . . " and no method or process step herein is to be construed under those provisions unless the step, or steps, are expressly recited using the phrase "comprising the step(s) of . . . ."

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

What is claimed is:

1. An electric field-controlled refractive index tunable device comprising:
    a phase change correlated transition metal oxide layer; and
    E-field responsive charge dopants, wherein the E-field responsive charge dopants either accumulate in the phase change correlated transition metal oxide layer or are depleted from the phase change correlated transition metal oxide layer in response to an E-field applied to the phase change correlated transition metal oxide layer;
    wherein the phase change correlated transition metal oxide layer has an optical extinction coefficient k of less than 0.01.

2. The electric field-controlled refractive index tunable device of claim 1 wherein the phase change correlated transition metal oxide layer comprises $NdNiO_3$, $SmNiO_3$, PrNiO3, EuNiO$_3$, or GdNiO$_3$, or any combination of NdNiO$_3$, SmNiO$_3$, PrNiO3, EuNiO$_3$, and GdNiO$_3$.

3. An electric field-controlled refractive index tunable device comprising:
- a phase change correlated transition metal oxide layer; and
- E-field responsive charge dopants, wherein the E-field responsive charge dopants either accumulate in the phase change correlated transition metal oxide layer or are depleted from the phase change correlated transition metal oxide layer in response to an E-field applied to the phase change correlated transition metal oxide layer;

wherein the E-field responsive charge dopants comprise hydrogen dopants.

4. An electric field-controlled refractive index tunable device comprising:
- a phase change correlated transition metal oxide layer; and
- E-field responsive charge dopants, wherein the E-field responsive charge dopants either accumulate in the phase change correlated transition metal oxide layer or are depleted from the phase change correlated transition metal oxide layer in response to an E-field applied to the phase change correlated transition metal oxide layer;

the device further comprising either:
- a substrate;
- a bottom electrode on the substrate;
- a diffusion barrier layer on the bottom electrode, wherein the phase change correlated transition metal oxide layer is on the diffusion barrier layer; and
- an optically transparent top electrode on the phase change correlated transition metal oxide layer; or
- a substrate;
- a diffusion barrier on the substrate;
- a bottom electrode on the diffusion barrier, wherein the phase change correlated transition metal oxide (PCMO) layer is on the bottom electrode; and
- an optically transparent top electrode on the phase change correlated transition metal oxide (PCMO) layer.

5. The electric field-controlled refractive index tunable device of claim 4, comprising a substrate;
- a bottom electrode on the substrate;
- a diffusion barrier layer on the bottom electrode, wherein the phase change correlated transition metal oxide layer is on the diffusion barrier layer; and
- an optically transparent top electrode on the phase change correlated transition metal oxide layer:
- wherein the optically transparent top electrode comprises:
  - a catalytic transition metal comprising Pt, Pd, or Ni;
  - an ultrathin catalytic transition metallic film comprising Pt, Pd, or Ni;
  - a graphene layer; or
  - a LaNiO$_3$-based layer;
- wherein the diffusion barrier layer comprises:
  - a graphene layer; or
  - a nitride-based dielectric thin film; or
  - an oxide-based dielectric thin film and
- wherein the substrate comprises:
  - a semiconductor, Si, GaAs, SiC, an electrically insulating wafer, SiO$_2$, Si$_3$N$_4$, LaAlO$_3$, BaTiO$_3$, SrTiO$_3$, glass, a mechanically rigid substrate, or a flexible substrate, such as polyethylene terephthalate (PET).

6. The electric field-controlled refractive index tunable device of claim 4, comprising a substrate;
- a bottom electrode on the substrate;
- a diffusion barrier layer on the bottom electrode, wherein the phase change correlated transition metal oxide layer is on the diffusion barrier layer; and
- an optically transparent top electrode on the phase change correlated transition metal oxide layer; wherein:
  - a positive E-field between the optically transparent top electrode and the bottom electrode causes positively charged or electron accepting E-field responsive charge dopants to accumulate in the phase change correlated transition metal oxide layer, and causes the refractive index of the phase change correlated transition metal oxide layer to be substantially $n_0 + \circledast n$; and
  - a negative E-field between the optically transparent top electrode and the bottom electrode causes positively charged or electron accepting E-field responsive charge dopants to be depleted from the phase change correlated transition metal oxide layer and to move to the optically transparent top electrode, and causes the refractive index of the phase change correlated transition metal oxide layer to be substantially $n_0$;
  - wherein $n_0$ is a refractive index for pristine and undoped phase change correlated transition metal oxide layer; and
  - wherein $n_0 + \circledast n$ is a refractive index for phase change correlated transition metal oxide layer having E-field responsive charge dopants.

7. The electric field-controlled refractive index tunable device of claim 4, comprising a substrate;
- a bottom electrode on the substrate;
- a diffusion barrier layer on the bottom electrode, wherein the phase change correlated transition metal oxide layer is on the diffusion barrier layer; and
- an optically transparent top electrode on the phase change correlated transition metal oxide layer; wherein:
  - a negative E-field between the optically transparent top electrode and the bottom electrode causes negatively charged or electron donating E-field responsive charge dopants to accumulate in the phase change correlated transition metal oxide layer, and causes the refractive index of the phase change correlated transition metal oxide layer to be substantially $n_0 + \circledast n$; and
  - a positive E-field between the optically transparent top electrode and the bottom electrode causes negatively charged or electron donating E-field responsive charge dopants to be depleted from the phase change correlated transition metal oxide layer and to move to the optically transparent top electrode, and causes the refractive index of the phase change correlated transition metal oxide layer to be substantially $n_0$;
  - wherein $n_0$ is a refractive index for pristine and undoped phase change correlated transition metal oxide layer; and
  - wherein $n_0 + \circledast n$ is a refractive index for phase change correlated transition metal oxide layer having E-field responsive charge dopants.

8. The electric field-controlled refractive index tunable device of claim 4, comprising a substrate;
- a bottom electrode on the substrate;
- a diffusion barrier layer on the bottom electrode, wherein the phase change correlated transition metal oxide layer is on the diffusion barrier layer; and
- an optically transparent top electrode on the phase change correlated transition metal oxide layer:
  - wherein a refractive index of the phase change correlated transition metal oxide film layer may be set to a desired value between a range from $n_0$ to $n_0 + \circledast n$ by tuning the E-field between the optically transparent top electrode and the bottom electrode;

wherein $n_0$ is a refractive index for pristine and undoped phase change correlated transition metal oxide layer; and wherein $n_0 + \circledast n$ is a refractive index for phase change correlated transition metal oxide layer having E-field responsive charge dopants.

9. The electric field-controlled refractive index tunable device of claim 4, comprising a substrate;
   a bottom electrode on the substrate;
   a diffusion barrier layer on the bottom electrode, wherein the phase change correlated transition metal oxide layer is on the diffusion barrier layer; and
   an optically transparent top electrode on the phase change correlated transition metal oxide layer:
   wherein a reconfiguration time for changing the refractive index of the phase change correlated transition metal oxide (PCMO) film layer from $n_0$ to $n_0 + \circledast n$, or from $n_0 + \circledast n$ to $n_0$ is less than 1 microsecond;
   wherein $n_0$ is a refractive index for pristine and undoped phase change correlated transition metal oxide layer; and
   wherein $n_0 + \circledast n$ is a refractive index for phase change correlated transition metal oxide layer having E-field responsive charge dopants.

10. The electric field-controlled refractive index tunable device of claim 4, comprising a substrate;
   a diffusion barrier on the substrate;
   a bottom electrode on the diffusion barrier, wherein the phase change correlated transition metal oxide (PCMO) layer is on the bottom electrode; and
   an optically transparent top electrode on the phase change correlated transition metal oxide (PCMO) layer:
   wherein the optically transparent top electrode comprises:
     a catalytic transition metal comprising Pt, Pd, or Ni;
     an ultrathin catalytic transition metallic film comprising Pt, Pd, or Ni;
     a graphene layer; or
     a $LaNiO_3$-based layer;
   wherein the diffusion barrier layer comprises:
     a graphene layer; or
     a nitride-based dielectric thin film; or
     an oxide-based dielectric thin film and
   wherein the substrate comprises:
     a semiconductor, Si, GaAs, SiC, an electrically insulating wafer, $SiO_2$, $Si_3N_4$, $LaAlO_3$, $BaTiO_3$, $SrTiO_3$, glass, a mechanically rigid substrate, or a flexible substrate, such as polyethylene terephthalate (PET).

11. The electric field-controlled refractive index tunable device of claim 4, comprising a substrate;
   a diffusion barrier on the substrate;
   a bottom electrode on the diffusion barrier, wherein the phase change correlated transition metal oxide (PCMO) layer is on the bottom electrode; and
   an optically transparent top electrode on the phase change correlated transition metal oxide (PCMO) layer; wherein:
   a positive E-field between the optically transparent top electrode and the bottom electrode causes positively charged or electron-accepting E-field responsive charge dopants to accumulate in the phase change correlated transition metal oxide layer, and causes the refractive index of the phase change correlated transition metal oxide layer to be substantially $n_0 + \circledast n$; and
   a negative E-field between the optically transparent top electrode and the bottom electrode causes positively charged or electron-accepting E-field responsive charge dopants to be depleted from the phase change correlated transition metal oxide layer and to move to the optically transparent top electrode, and causes the refractive index of the phase change correlated transition metal oxide layer to be substantially $n_0$;
   wherein $n_0$ is a refractive index for a pristine and undoped phase change correlated transition metal oxide layer; and
   wherein $n_0 + \circledast n$ is a refractive index for a phase change correlated transition metal oxide layer having E-field responsive charge dopants;
   or
   a positive E-field between the bottom electrode and the optically transparent top electrode causes positively charged or electron-accepting E-field responsive charge dopants to accumulate in the phase change correlated transition metal oxide layer, and causes the refractive index of the phase change correlated transition metal oxide layer to be substantially $n_0 + \circledast n$; and
   a negative E-field between the bottom electrode and the optically transparent top electrode causes positively charged or electron-accepting E-field responsive charge dopants to be depleted from the phase change correlated transition metal oxide layer and to move to the bottom electrode, and causes the refractive index of the phase change correlated transition metal oxide layer to be substantially $n_0$;
   wherein $n_0$ is a refractive index for a pristine and undoped phase change correlated transition metal oxide layer; and
   wherein $n_0 + \circledast n$ is a refractive index for a phase change correlated transition metal oxide layer having E-field responsive charge dopants.

12. The electric field-controlled refractive index tunable device of claim 4, comprising a substrate;
   a diffusion barrier on the substrate;
   a bottom electrode on the diffusion barrier, wherein the phase change correlated transition metal oxide (PCMO) layer is on the bottom electrode; and
   an optically transparent top electrode on the phase change correlated transition metal oxide (PCMO) layer; wherein:
   a negative E-field between the optically transparent top electrode and the bottom electrode causes negatively charged or electron donating E-field responsive charge dopants to accumulate in the phase change correlated transition metal oxide layer, and causes the refractive index of the phase change correlated transition metal oxide layer to be substantially $n_0 + \circledast n$; and
   a positive E-field between the optically transparent top electrode and the bottom electrode causes negatively charged or electron donating E-field responsive charge dopants to be depleted from the phase change correlated transition metal oxide layer and to move to the optically transparent top electrode, and causes the refractive index of the phase change correlated transition metal oxide layer to be substantially $n_0$;
   wherein $n_0$ is a refractive index for pristine and undoped phase change correlated transition metal oxide layer; and
   wherein $n_0 + \circledast n$ is a refractive index for phase change correlated transition metal oxide layer having E-field responsive charge dopants;
   or a negative E-field between the bottom electrode and the optically transparent top electrode causes negatively charged or electron donating E-field responsive charge dopants to accumulate in the phase change correlated transition metal oxide layer, and causes the refractive index of the phase change correlated transition metal oxide layer to be substantially $n_0 + \delta n$; and a positive E-field between the bottom electrode and the optically transparent top electrode causes negatively charged or electron donating E-field responsive charge dopants to be depleted from the phase change correlated transition metal oxide layer and to move to the bottom electrode, and causes the refractive index of the phase change correlated transition metal oxide layer to be substantially $n_0$;

wherein $n_0$ is a refractive index for pristine and undoped phase change correlated transition metal oxide layer; and wherein $n_0 + \delta n$ is a refractive index for phase change correlated transition metal oxide layer having E-field responsive charge dopants.

13. The electric field-controlled refractive index tunable device of claim 4, comprising a substrate;
a diffusion barrier on the substrate;
a bottom electrode on the diffusion barrier, wherein the phase change correlated transition metal oxide (PCMO) layer is on the bottom electrode; and
an optically transparent top electrode on the phase change correlated transition metal oxide (PCMO) layer:
wherein a refractive index of the phase change correlated transition metal oxide film layer may be set to a desired value between a range from $n_0$ to $n_0 + \delta n$ by tuning the E-field between the optically transparent top electrode and the bottom electrode;
wherein $n_0$ is a refractive index for a pristine and undoped phase change correlated transition metal oxide layer; and
wherein $n_0 + \delta n$ is a refractive index for a phase change correlated transition metal oxide layer having E-field responsive charge dopants.

14. The electric field-controlled refractive index tunable device of claim 4, comprising a substrate;
a diffusion barrier on the substrate;
a bottom electrode on the diffusion barrier, wherein the phase change correlated transition metal oxide (PCMO) layer is on the bottom electrode; and
an optically transparent top electrode on the phase change correlated transition metal oxide (PCMO) layer:
wherein a reconfiguration time for changing the refractive index of the phase change correlated transition metal oxide (PCMO) film layer from $n_0$ to $n_0 + \delta n$, or from $n_0 + \delta n$ to $n_0$ is less than 1 microsecond;
wherein $n_0$ is a refractive index for pristine and undoped phase change correlated transition metal oxide layer; and
wherein $n_0 + \delta n$ is a refractive index for phase change correlated transition metal oxide layer having E-field responsive charge dopants.

15. A method of providing an electric field-controlled refractive index tunable device comprising:
providing a phase change correlated transition metal oxide layer;
providing E-field responsive charge dopants; and
tuning an E-field on the phase change correlated transition metal oxide layer to either accumulate E-field responsive charge dopants in the phase change correlated transition metal oxide layer or to deplete E-field responsive charge dopants from the phase change correlated transition metal oxide layer; wherein the phase change correlated transition metal oxide layer has an optical extinction coefficient k of less than 0.01.

16. The method of claim 15 wherein the phase change correlated transition metal oxide layer comprises $NdNiO_3$, $SmNiO_3$, $PrNiO3$, $EuNiO_3$, or $GdNiO_3$, or any combination of $NdNiO_3$, $SmNiO_3$, $PrNiO3$, $EuNiO_3$, and $GdNiO_3$.

17. A method of providing an electric field-controlled refractive index tunable device comprising:
providing a phase change correlated transition metal oxide layer;
providing E-field responsive charge dopants; and
tuning an E-field on the phase change correlated transition metal oxide layer to either accumulate E-field responsive charge dopants in the phase change correlated transition metal oxide layer or to deplete E-field responsive charge dopants from the phase change correlated transition metal oxide layer; wherein the E-field responsive charge dopants comprise hydrogen dopants.

18. A method of providing an electric field-controlled refractive index tunable device comprising:
providing a phase change correlated transition metal oxide layer;
providing E-field responsive charge dopants; and
tuning an E-field on the phase change correlated transition metal oxide layer to either accumulate E-field responsive charge dopants in the phase change correlated transition metal oxide layer or to deplete E-field responsive charge dopants from the phase change correlated transition metal oxide layer; the method further comprising either:
providing a substrate;
providing a bottom electrode on the substrate;
providing a diffusion barrier layer on the bottom electrode, wherein the phase change correlated transition metal oxide layer is on the diffusion barrier layer; and
providing an optically transparent top electrode on the phase change correlated transition metal oxide layer; or
providing a substrate;
providing a diffusion barrier on the substrate;
providing a bottom electrode on the diffusion barrier, wherein the phase change correlated transition metal oxide (PCMO) layer is on the bottom electrode; and
providing an optically transparent top electrode on the phase change correlated transition metal oxide (PCMO) layer.

19. The method of claim 18, wherein the method comprises providing a substrate;
providing a bottom electrode on the substrate;
providing a diffusion barrier layer on the bottom electrode, wherein the phase change correlated transition metal oxide layer is on the diffusion barrier layer; and
providing an optically transparent top electrode on the phase change correlated transition metal oxide layer:
wherein the optically transparent top electrode comprises:
a catalytic transition metal comprising Pt, Pd, or Ni;
an ultrathin catalytic transition metallic film comprising Pt, Pd, or Ni;
a graphene layer; or
a $LaNiO_3$-based layer;
wherein the diffusion barrier layer comprises:
a graphene layer; or
a nitride-based dielectric thin film; or
an oxide-based dielectric thin film and
wherein the substrate comprises:
a semiconductor, Si, GaAs, SiC, an electrically insulating wafer, $SiO_2$, $Si_3N_4$, $LaAlO_3$, $BaTiO_3$, $SrTiO_3$, glass, a mechanically rigid substrate, or a flexible substrate, such as polyethylene terephthalate (PET).

20. The method of claim 18 wherein the method comprises providing a substrate;
   providing a bottom electrode on the substrate;
   providing a diffusion barrier layer on the bottom electrode, wherein the phase change correlated transition metal oxide layer is on the diffusion barrier layer; and
   providing an optically transparent top electrode on the phase change correlated transition metal oxide layer;
   wherein:
   applying a positive E-field between the optically transparent top electrode and the bottom electrode causes positively charged or electron accepting E-field responsive charge dopants to accumulate in the phase change correlated transition metal oxide layer, and causes the refractive index of the phase change correlated transition metal oxide layer to be substantially $n_0 + \Delta n$; and
   applying a negative E-field between the optically transparent top electrode and the bottom electrode causes positively charged or electron accepting E-field responsive charge dopants to be depleted from the phase change correlated transition metal oxide layer and to move to the optically transparent top electrode, and causes the refractive index of the phase change correlated transition metal oxide layer to be substantially $n_0$;
   wherein $n_0$ is a refractive index for pristine and undoped phase change correlated transition metal oxide layer; and
   wherein $n_0 + \Delta n$ is a refractive index for phase change correlated transition metal oxide layer having E-field responsive charge dopants.

21. The method of claim 18; wherein the method comprises providing a substrate;
   providing a bottom electrode on the substrate;
   providing a diffusion barrier layer on the bottom electrode, wherein the phase change correlated transition metal oxide layer is on the diffusion barrier layer; and
   providing an optically transparent top electrode on the phase change correlated transition metal oxide layer;
   wherein:
   applying a negative E-field between the optically transparent top electrode and the bottom electrode causes negatively charged or electron donating E-field responsive charge dopants to accumulate in the phase change correlated transition metal oxide layer, and causes the refractive index of the phase change correlated transition metal oxide layer to be substantially $n_0 + \Delta n$; and
   applying a positive E-field between the optically transparent top electrode and the bottom electrode causes negatively charged or electron donating E-field responsive charge dopants to be depleted from the phase change correlated transition metal oxide layer and to move to the optically transparent top electrode, and causes the refractive index of the phase change correlated transition metal oxide layer to be substantially $n_0$;
   wherein $n_0$ is a refractive index for pristine and undoped phase change correlated transition metal oxide layer; and
   wherein $n_0 + \Delta n$ is a refractive index for phase change correlated transition metal oxide layer having E-field responsive charge dopants.

22. The method of claim 18; wherein the method comprises providing a substrate;
   providing a bottom electrode on the substrate;
   providing a diffusion barrier layer on the bottom electrode, wherein the phase change correlated transition metal oxide layer is on the diffusion barrier layer; and
   providing an optically transparent top electrode on the phase change correlated transition metal oxide layer:
   wherein a refractive index of the phase change correlated transition metal oxide film layer may be set to a desired value between a range from $n_0$ to $n_0 + \Delta n$ by tuning the E-field between the optically transparent top electrode and the bottom electrode;
   wherein $n_0$ is a refractive index for pristine and undoped phase change correlated transition metal oxide layer; and
   wherein $n_0 + \Delta n$ is a refractive index for phase change correlated transition metal oxide layer having E-field responsive charge dopants.

23. The method of claim 18; wherein the method comprises providing a substrate;
   providing a bottom electrode on the substrate;
   providing a diffusion barrier layer on the bottom electrode, wherein the phase change correlated transition metal oxide layer is on the diffusion barrier layer; and
   providing an optically transparent top electrode on the phase change correlated transition metal oxide layer:
   wherein a reconfiguration time for changing the refractive index of the phase change correlated transition metal oxide (PCMO) film layer from $n_0$ to $n_0 + \Delta n$, or from $n_0 + \Delta n$ to $n_0$ is less than 1 microsecond;
   wherein $n_0$ is a refractive index for pristine and undoped phase change correlated transition metal oxide layer; and
   wherein $n_0 + \Delta n$ is a refractive index for phase change correlated transition metal oxide layer having E-field responsive charge dopants.

24. The method of claim 18, wherein the method comprises providing a substrate;
   providing a diffusion barrier on the substrate;
   providing a bottom electrode on the diffusion barrier, wherein the phase change correlated transition metal oxide (PCMO) layer is on the bottom electrode; and
   providing an optically transparent top electrode on the phase change correlated transition metal oxide (PCMO) layer:
   wherein the optically transparent top electrode comprises:
      a catalytic transition metal comprising Pt, Pd, or Ni;
      an ultrathin catalytic transition metallic film comprising Pt, Pd, or Ni;
      a graphene layer; or
      a $LaNiO_3$-based layer;
   wherein the diffusion barrier layer comprises:
      a graphene layer; or
      a nitride-based dielectric thin film; or
      an oxide-based dielectric thin film and
   wherein the substrate comprises:
      a semiconductor, Si, GaAs, SiC, an electrically insulating wafer, $SiO_2$, $Si_3N_4$, $LaAlO_3$, $BaTiO_3$, $SrTiO_3$, glass, a mechanically rigid substrate, or a flexible substrate, such as polyethylene terephthalate (PET).

25. The method of claim 18, wherein the method comprises providing a substrate;
   providing a diffusion barrier on the substrate;
   providing a bottom electrode on the diffusion barrier, wherein the phase change correlated transition metal oxide (PCMO) layer is on the bottom electrode; and
   providing an optically transparent top electrode on the phase change correlated transition metal oxide (PCMO) layer; wherein:

applying a positive E-field between the optically transparent top electrode and the bottom electrode causes positively charged or electron-accepting E-field responsive charge dopants to accumulate in the phase change correlated transition metal oxide layer, and causes the refractive index of the phase change correlated transition metal oxide layer to be substantially $n_0 + \otimes n$; and applying a negative E-field between the optically transparent top electrode and the bottom electrode causes positively charged or electron-accepting E-field responsive charge dopants to be depleted from the phase change correlated transition metal oxide layer and to move to the optically transparent top electrode, and causes the refractive index of the phase change correlated transition metal oxide layer to be substantially $n_0$;

wherein $n_0$ is a refractive index for a pristine and undoped phase change correlated transition metal oxide layer; and wherein $n_0 + \otimes n$ is a refractive index for a phase change correlated transition metal oxide layer having E-field responsive charge dopants;

or applying a positive E-field between the bottom electrode and the optically transparent top electrode causes positively charged or electron-accepting E-field responsive charge dopants to accumulate in the phase change correlated transition metal oxide layer, and causes the refractive index of the phase change correlated transition metal oxide layer to be substantially $n_0 + \otimes n$; and applying a negative E-field between the bottom electrode and the optically transparent top electrode causes positively charged or electron-accepting E-field responsive charge dopants to be depleted from the phase change correlated transition metal oxide layer and to move to the bottom electrode, and causes the refractive index of the phase change correlated transition metal oxide layer to be substantially $n_0$;

wherein $n_0$ is a refractive index for a pristine and undoped phase change correlated transition metal oxide layer; and wherein $n_0 + \otimes n$ is a refractive index for a phase change correlated transition metal oxide layer having E-field responsive charge dopants.

26. The method of claim 18; wherein the method comprises providing a substrate;

providing a diffusion barrier on the substrate;

providing a bottom electrode on the diffusion barrier, wherein the phase change correlated transition metal oxide (PCMO) layer is on the bottom electrode; and providing an optically transparent top electrode on the phase change correlated transition metal oxide (PCMO) layer; wherein:

applying a negative E-field between the optically transparent top electrode and the bottom electrode causes negatively charged or electron donating E-field responsive charge dopants to accumulate in the phase change correlated transition metal oxide layer, and causes the refractive index of the phase change correlated transition metal oxide layer to be substantially $n_0 + \otimes n$; and applying a positive E-field between the optically transparent top electrode and the bottom electrode causes negatively charged or electron donating E-field responsive charge dopants to be depleted from the phase change correlated transition metal oxide layer and to move to the optically transparent top electrode, and causes the refractive index of the phase change correlated transition metal oxide layer to be substantially $n_0$;

wherein $n_0$ is a refractive index for pristine and undoped phase change correlated transition metal oxide layer; and wherein $n_0 + \otimes n$ is a refractive index for phase change correlated transition metal oxide layer having E-field responsive charge dopants;

or applying a negative E-field between the bottom electrode and the optically transparent top electrode causes negatively charged or electron donating E-field responsive charge dopants to accumulate in the phase change correlated transition metal oxide layer, and causes the refractive index of the phase change correlated transition metal oxide layer to be substantially $n_0 + \otimes n$; and applying a positive E-field between the bottom electrode and the optically transparent top electrode causes negatively charged or electron donating E-field responsive charge dopants to be depleted from the phase change correlated transition metal oxide layer and to move to the bottom electrode, and causes the refractive index of the phase change correlated transition metal oxide layer to be substantially $n_0$;

wherein $n_0$ is a refractive index for pristine and undoped phase change correlated transition metal oxide layer; and wherein $n_0 + \otimes n$ is a refractive index for phase change correlated transition metal oxide layer having E-field responsive charge dopants.

27. The method of claim 18; wherein the method comprises providing a substrate;

providing a diffusion barrier on the substrate;

providing a bottom electrode on the diffusion barrier, wherein the phase change correlated transition metal oxide (PCMO) layer is on the bottom electrode; and providing an optically transparent top electrode on the phase change correlated transition metal oxide (PCMO) layer:

wherein a refractive index of the phase change correlated transition metal oxide film layer may be set to a desired value between a range from $n_0$ to $n_0 + \otimes n$ by tuning the E-field between the optically transparent top electrode and the bottom electrode;

wherein $n_0$ is a refractive index for a pristine and undoped phase change correlated transition metal oxide layer; and wherein $n_0 + \otimes n$ is a refractive index for a phase change correlated transition metal oxide layer having E-field responsive charge dopants.

28. The method of claim 18; wherein the method comprises providing a substrate;

providing a diffusion barrier on the substrate;

providing a bottom electrode on the diffusion barrier, wherein the phase change correlated transition metal oxide (PCMO) layer is on the bottom electrode; and providing an optically transparent top electrode on the phase change correlated transition metal oxide (PCMO) layer:

wherein a reconfiguration time for changing the refractive index of the phase change correlated transition metal oxide (PCMO) film layer from $n_0$ to $n_0 + \otimes n$, or from $n_0 + \otimes n$ to $n_0$ is less than 1 microsecond;

wherein $n_0$ is a refractive index for pristine and undoped phase change correlated transition metal oxide layer; and wherein $n_0 + \delta n$ is a refractive index for phase change correlated transition metal oxide layer having E-field responsive charge dopants.

* * * * *